April 24, 1962  C. E. BLANK  3,030,936
COMBINED THROTTLE AND STOP VALVE
Filed May 20, 1959  3 Sheets-Sheet 1

INVENTOR
CHARLES E. BLANK
BY
HIS ATTORNEY

INVENTOR
CHARLES E. BLANK
BY
HIS ATTORNEY

April 24, 1962

C. E. BLANK 3,030,936

COMBINED THROTTLE AND STOP VALVE

Filed May 20, 1959

3 Sheets-Sheet 3

INVENTOR
CHARLES E. BLANK
BY
HIS ATTORNEY

United States Patent Office 3,030,936
Patented Apr. 24, 1962

3,030,936
COMBINED THROTTLE AND STOP VALVE
Charles E. Blank, Painted Post, N.Y., assignor to Ingersoll-Rand Company, New York, N.Y., a corporation of New Jersey
Filed May 20, 1959, Ser. No. 814,549
7 Claims. (Cl. 121—157)

This invention relates to a fluid control device for controlling flow of fluid through a conduit, and more particularly to such a device for controlling the flow of fluid through an inlet of a machine such as a steam engine.

One object of this invention is to provide a sensitive quick acting automatic control device for a machine, such as a steam engine.

Another object of this invention is to provide a novel valve structure for such control device.

Figure 1:
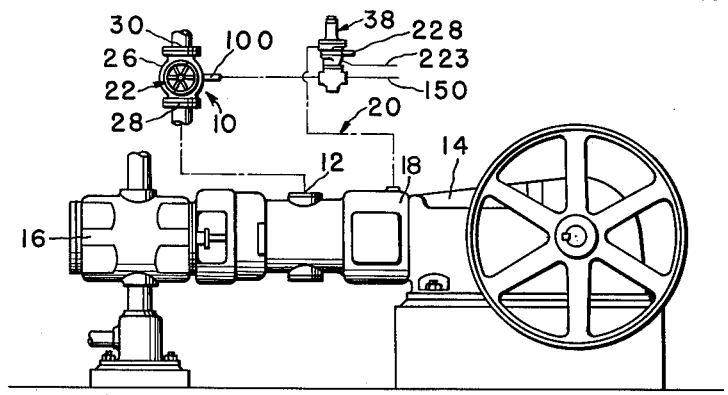
Figure 3:
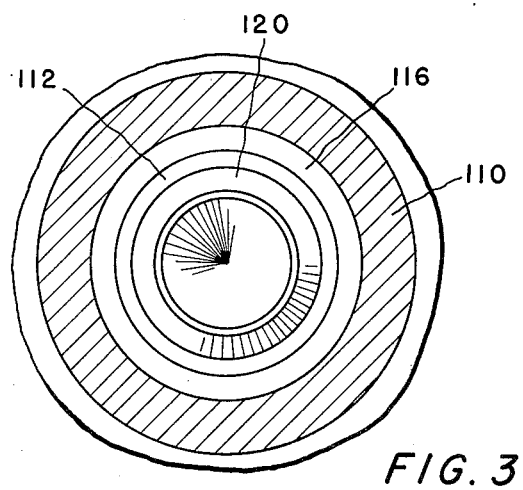
Figure 2:
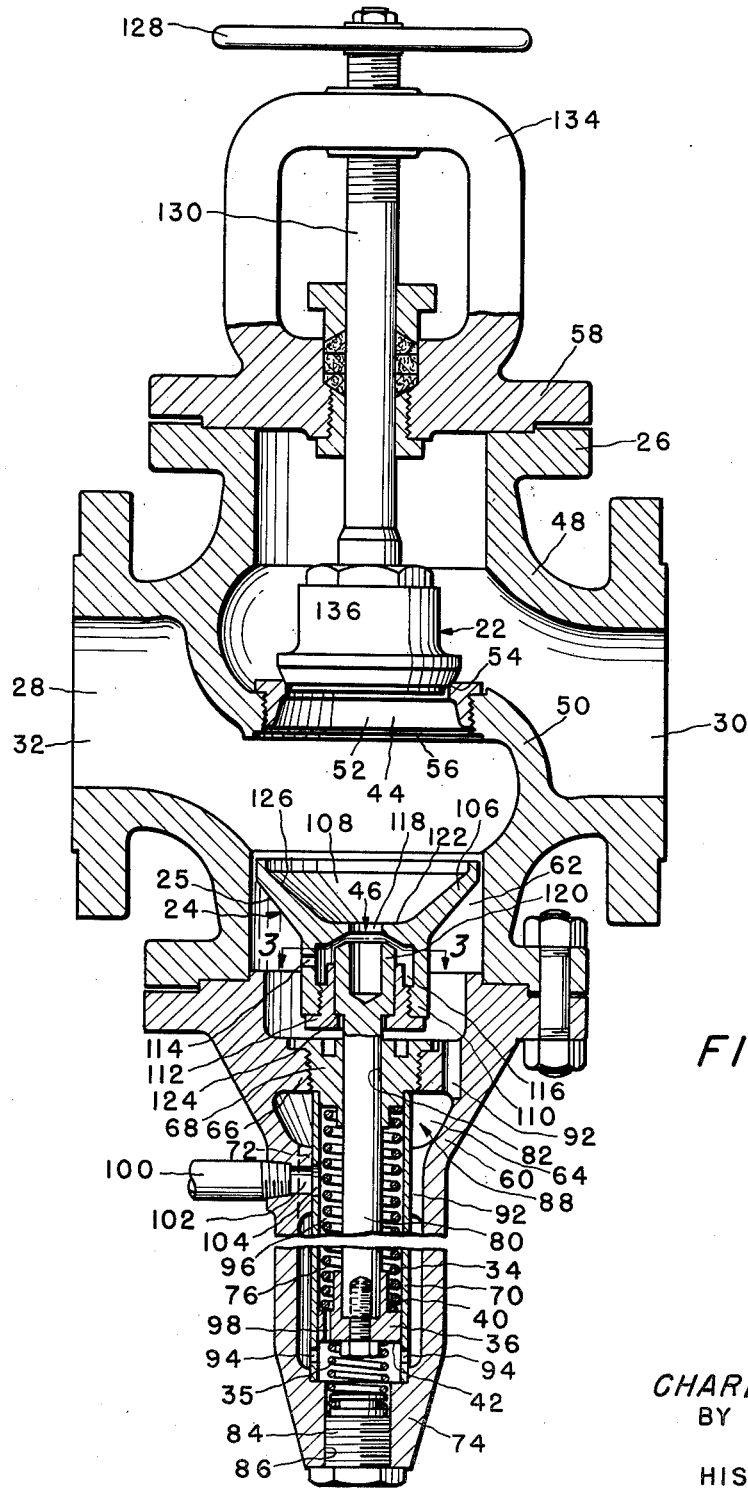
Figures 4, 5, 6:
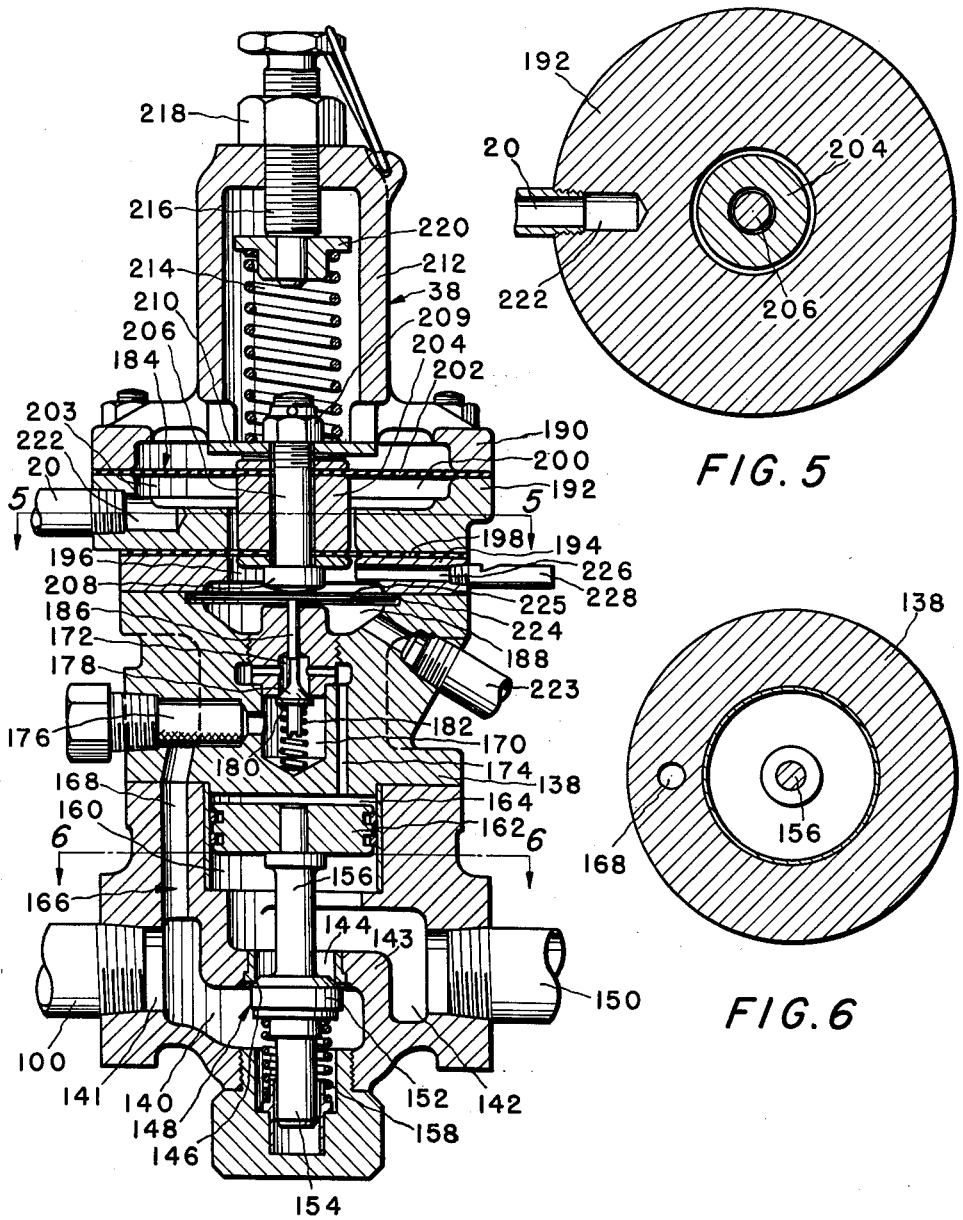

Further objects will become obvious from the following description and drawings in which:

FIGURE 1 is a longitudinal view of a steam-driven compressor schematically showing the connection between the fluid control device and the steam engine and between components of such device, FIG. 2 is a longitudinal view, partly in section, of a combined throttle and stop valve of the fluid control device, FIG. 3 is a cross-section of FIG. 2 taken along the lines 3—3 looking in the direction of the arrows, FIG. 4 is a longitudinal view, partly in section, of a trip mechanism of the fluid control device and FIGS. 5 and 6 are cross-sections of FIG. 4 taken along the lines 5—5 and 6—6, respectively, looking in the direction of the arrows.

Referring to the drawings and first to FIGURE 1, the fluid control device 10 is connected in the inlet conduit 12 of a pressure fluid driven machine, such as the steam engine 14, arranged to drive a compressor 16. An oil lubricating system 18 is provided for this unit of a conventional type. This system 18 is adapted to develop oil pressure under normal conditions of predetermined limits to ensure the supply of lubricant to the motor.

The device 10 includes a combined manually operated throttle valve 22 and an automatically operated stop or emergency valve 24 housed in a casing 26 having a passage 28 therethrough connected into the inlet conduit 12. The throttle valve 22 is located in the downstream portion 30 of the passage 28 and is manually operable to control the flow of steam to the engine 14.

The emergency valve 24 is located in the upstream portion 32 of the passage 28 and is maintained in its opened position unless the oil pressure of the lubricating system 18 becomes abnormal. If this occurs, the valve 24 is actuated to its closed position to cut off flow to the engine 14 independently of the valve 22. More particularly, when the oil pressure is within normal limits, means, such as a spring 34, maintains the valve 24 in its opened position. And the steam pressure on opposite sides of the member or piston 36 exposed to pressure in the upstream portion of the conduit 28 and operatively connected to the valve 24, is balanced. However, when the oil pressure becomes abnormal, a trip mechanism 38 actuated in response to such abnormal pressure exhausts steam from the area adjacent one surface 40 of the member 36. This effects a pressure differential across the member 36 with the pressure forces acting in the direction of the valve 24 on a piston surface 42 opposite the piston surface 40, being sufficient to overcome the biasing action of the spring 34 to seat the valve 24.

Once the valve 24 is closed it cannot be re-opened by merely balancing the pressure across the member 36 because of the steam pressure acting on one side only, surface 25, the valve exposed to the upstream portion 32 of the passage 28. To substantially balance the pressure across the closed valve 24 the valve 22 must also be closed to define a compartment 44 therebetween. A conduit, in this instance a passage 46 through the valve 24, conveys steam from the upstream portion 32 to the compartment 44. Consequently steam pressure across the valve 24 becomes substantially balanced and the valve 24 will then be urged into its opened position by a spring 34. With the valve 24 in its opened position, steam still cannot flow to the engine 14 until the valve 22 is opened. In this manner accidental restarting of the steam flow to the engine 14 is avoided.

Referring to the details of the invention, the casing 26 includes a central portion 48 through which the passage 28 extends. Disposed across the passage 28 is a flange 50 having a hole 52 therethrough defining a portion of the passage 28. The opposite sides of the casing portion 48 are open and flanged to form with the parts supported thereby housings 58 and 60 for the valves 22 and 24, respectfully, with the valves 22 and 24 extending therefrom into the passage 28 in alignment with one another and movable on and off their respective valve seats 54 and 56 on the downstream and upstream sides of the flange 50. The housing 60 for the valve 24 is cylindrical and is bolted to the casing 26 on the upstream side thereof. The housing 60 includes a recess 62 therein open to the passage 28 and a chamber 64 separated from such recess 62 by an annular flange 66.

Threaded into the flange 66 is a stop member 68 to limit rearward movement of the valve 24 and against which a sleeve 70, concentrically mounted in the chamber 64, bears. The sleeve 70 extends through an annular flange 72 extending into the chamber 64 and abuts the outer end 74 of the housing 60.

With the ends of the sleeve 70 closed off, a chamber 76 is defined therein in which the piston 36 is slidable. Secured to the piston 36 is a stem or piston rod 80 which extends through the piston chamber 76 and a bore 82 in the stop member 68 to connect the piston 36 with the valve 24. The spring 34 is mounted in the sleeve 70 biased between the stop member 68 and the piston 36 to constantly urge the valve 24 off its seat 56. A spring 35 secured to a plug 84 in a hole 86 at the outer end 74 of the housing 60 halts the outward movement of the piston 36.

The piston 36 is exposed on its opposed surfaces 40 and 42 to steam conducted thereto by a passageway 88 leading from the upstream portion 32 of the passage 28 thereto. The passageway 88 includes the recess 62, the chamber 64, longitudinal bores 92 in the flanges 66 and 72, and radial bores 94 in the sleeve 70 at the outer end thereof. Steam is conveyed to the portion 96 of the sleeve chamber 76 inward of the piston 36 by a bore 98 through the piston 36. As an alternate to the bore 98, steam may reach the inner portion 96 by leakage past the piston 36.

To exhaust fluid from the chamber portion 96 or the area adjacent the piston surface 40, a conduit 100 of the trip mechanism 38 is connected to the chamber inner portion 96 by a radial bore 104 through the sleeve 70 at the flange 72 and a corresponding radial bore 102 through the housing wall and the flange 72.

The valve 24 includes a head 106 of bowl or cone shape movable on and off the seat 56 with the recess 108 thereof open downstream. Extending rearwardly from the head 106 is a sleeve or neck 110 threaded to receive a complementary threaded member 112 which extends into the neck 110. The passage 46 in the valve 24 includes a radial bore 114 in the peripheral wall of the neck 110, a chamber 116 is said neck 110 defined by the space between the member 112 and the base 122 of the head 106, and a longitudinal port 118 through the base 122 of the head 106.

The stem 80 includes a plunger 120 at the valve end of greater diameter than the stem 80. The plunger 120 is slidable in the member 112 and extends into the chamber 116 to control the flow of steam through the port 118. More particularly, when the trip mechanism 38 exhausts steam from the inner portion 96 of the sleeve chamber 76 the piston 36 moves the plunger 120 relative to the valve 24 until the plunger 120 abuts the base 122 of the head 106. At such time the piston 36 moves the valve 24 onto its seat 56 to cut off the flow of steam to the motor 14. The plunger 120 is maintained seated against the valve base 122 by steam pressure acting on the rear surface 42 of piston 36. Steam flowing through the port 114 into the chamber 116 leaks between the base 122 and the plunger 120 through the port 118 into the recess 108. If the valve 20 is open, such leakage flow is insufficient to raise the pressure downstream of the valve. And the steam acting on the head surface 25 exposed to the passage upstream portion 32 keeps the valve 24 seated.

When the valve 22 is closed, the compartment 44 is confined and steam leaking into the recess 108 builds up pressure at the head inner surface 126 to a predetermined value and the spring 34 will urge the valve 24 into its open position off its seat 56.

In order to insure quick and sure action of the valve 24, the plunger 120 is designed to be opened at a pressure in the compartment 44 which is lower than the predetermined pressure at which the valve 24 opens. More particularly, because of the relatively small pressure surface areas of the plunger 120, compared to the valve 24, and because the restriction to flow between the plunger and base 122, the spring 34 will unseat the plunger 120 after only a relatively small build up of pressure in the compartment 44. Unseating of the plunger results in opening up the passage 46 to rapidly supply steam under pressure to the compartment 44 to open the valve 24.

The throttle valve 22 is of a conventional type having a handle 128 secured to a stem 130 threaded through a ring 134 integral with the housing 58. A head 136 is secured at the opposite end of the stem 130 in the downstream portion 30 of the passage 28. Rotation of the handle 128 moves the valve 22 on and off its seat 54.

The trip mechanism 38 includes a casing 138 having a passage 140 therethrough connected to the chamber 76 of the sleeve 70 by a conduit 100. Disposed across the passage 140 is a flange 143 having a hole 144 therethrough for the passage of steam from the upstream portion 141 to the downstream portion 142 of the passage 140. Connected into the passage downstream portion 142 is a conduit 150 for exhausting steam therefrom.

A valve 148 in the passage upstream portion 141 controls the flow of steam to the conduit 150 and includes a cylindrical head 152 adapted to move on and off a seat 146 in the flange 143 at the hole 144. Extending from opposed portions of the head 152 are stems 154 and 156 with the stem 154 slidable in the casing 138.

A spring 158 biased between the head 152 and the casing 138 constantly urges the valve toward its seat 146. The opposed stem 156 extends into a cylinder 160 in the casing 138 with a piston 162 fixed to the stem 156 and slidable in the cylinder 160. When steam is conveyed to the piston chamber 164 defined by the space between the piston 162 and the casing 138, it acts on the piston 162 to urge the valve 148 off its seat 146 whereupon steam is exhausted from the chamber sleeve 70 thereby causing the emergency valve 24 to close.

Steam is conveyed to the piston chamber 164 by conduit means 166 made up of a plurality of passages in the casing 138 open at one end to the upstream portion 141 of the passage 140 and at the opposite end to the piston chamber 164. More particularly, the conduit means 166 includes a passage 168 open at one end to the passage 140, a chamber 170 centrally located in the casing 138 adjacent and in alignment with the piston chamber 164 and into which the other end of the passage 168 opens, a bore 172 in longitudinal alignment with the chamber 170 and opened thereto, and a passage 174 connecting the bore 172 with the piston chamber 164. A strainer 176 is located in the passage 168 to screen foreign matter therefrom.

The flow of steam to the piston chamber 164 occurs only when there is an abnormal oil pressure of the motor. Accordingly a valve 178 is positioned in the chamber 170 movable on and off a seat 180 at the mouth of the bore 172 to control the flow of steam to the piston chamber 164. In the preferred form of the invention this control valve 178 is moved off its seat only when the oil pressure fails below a predetermined level. For example when a component of the system 18 fails; or when the engine 14 overspeeds. At other times a spring 182 biased between the valve 178 and the casing wall defining the chamber 170 maintains the valve closed. In addition, steam pressure in chamber 170 aids the action of the spring 182.

To move the valve 178 off its seat 180 an actuating device 184 is provided. The valve 178 has a stem 186 extending through the bore 172 into a recess 188 formed by the casing 138 for contact with the actuating device 184. The actuating device 184 includes three separate members 190, 192 and 194 bolted together and to the casing 138 with the member 194 in contact therewith. The members 192 and 194 form a central hole 196 open to the casing recess 188. This hole 196 is divided by a diaphragm 198 interposed between such members 192 and 194. The members 190 and 192 form a recess 200 opposed to the casing recess 188 and of greater cross-sectional area than the cross-sectional area of the hole 196. This recess 200 is bounded at one end by a diaphragm 202 interposed between the members 190 and 192.

Consequently, a fluid tight compartment 203 is formed between the diaphragms 198 and 202 made up of adjacent portions of the hole 196 and recess 200. Diaphragms 198 and 202 are joined by a member 204 with a plunger 206 extending therethrough. The plunger 206 has a head 208 adjacent the valve stem 186 with the other end thereof threaded to receive a nut 209 which secures a flat plate 210 to the member 204. The member 190 includes an outer hollow cylinder 212 housing a spring means including a spring 214 acting against the plate 210 to constantly urge the plunger 206 in a direction toward the valve 178 to unseat it. In this valve position steam is permitted to flow to the piston chamber 164. The biasing action of the spring 214 is adjustable by a bolt 216 extending through a complementary threaded nut 218 and into the cylinder 212 with the inner end of such bolt 216 adapted to receive a member 220 against which the spring 214 bears.

Oil from the lubricating system 18 is conveyed to the compartment 203 by the conduit 20 connected thereto by a radial bore 222 in the member 192. When the oil pressure is normal the diaphragms 198 and 202 flex as unit in a direction away from the valve stem because the surface area of the diaphragm 202 exposed to the pressure of the oil is much greater than the similar surface area of the diaphragm 198. However, when the oil pressure fails, the biasing action of the spring 214 flexes the diaphragms in a direction toward the valve acting against the valve stem 186 to unseat the valve 178.

When the engine 14 is starting the lubricating system 18 is correspondingly building up the pressure of the oil and such pressures are below the predetermined minimum to prevent opening of valve 178. However, it is desired not to cut off the steam flow to the engine 14. Accordingly, air under pressure from a suitable source is conveyed to the under side of a plurality of flexible plates 224 by a conduit 223 connected to the casing 138. The plates 224 are interposed between the valve stem 186 and the plunger head 208 to cause the plunger 206 to be moved away from the valve stem 186.

To notify an operator that air is being conveyed to the plates 224, which would prevent operation of the safety device the plates 224 have a plurality of holes 225 therethrough, only one of which is shown. The air then passes through a radial bore 226 in the member 194 and exhausts through a whistle 228 attached thereto. In this manner the operator is made aware that air is being supplied to the trip mechanism 38. Thus once the engine is started and the oil pressure reaches the desired value, the air supply through conduit 223 is cut off.

Reviewing briefly the operation of this invention, the throttle valve 22 is opened to supply steam to drive the engine, and the emergency valve 24 will be maintained off its seat 56 by the spring 34. Air is also supplied to prevent operation of the trip mechanism 38. When the engine 14 is operating, oil under pressure is supplied thereto by the lubricating system 18, and to the compartment 203 of the trip mechanism 38. The oil in the compartment 203 acts on the diaphragm 202 to hold away from the valve 178 so the valve 178 is maintained closed by the spring 182. Thus steam does not reach the piston chamber 164 and the valve 148 is maintained on its seat 146. Thus steam pressure builds up in the chamber portion 96 of the mechanism for actuating valve 24. The valve 24 is held open. The air supply to the mechanism 38 should be shut off.

When oil pressure fails or falls below a predetermined value, the spring 214 overcomes the diaphragm force and moves the plunger 206 to unseat the valve 178. Steam then flows through the piston chamber 164 acting on the piston 162 to unseat the valve 148. As a consequence steam from the chamber inner portion 96 is exhausted from the area adjacent the piston surface 40 and the steam pressure acting on the piston surface 42 causing the piston 36 and attached stem 80 to move. When the plunger 120 of the stem 80 abuts the base 122 of the emergency valve 24, the head portion 106 is moved onto its seat 56 thereby cutting off the steam flow to the engine 14.

When starting air pressure is supplied to chamber 188, the flow of steam to the piston chamber 164 of the mechanism 38 is cut off as hereinbefore described, and steam in the piston chamber 164 leaks past the piston 162 to exhaust the conduit 150 whereupon the spring 158 seats the valve 148. Thereafter steam flowing via the passageway 88 in the housing 60 balances the pressure across the piston 36.

However, the spring 34 cannot move the emergency valve 24 off its seat because the steam pressure acting on the valve surface 25. To balance the pressure across the valve head 106 the throttle valve 22 must be moved to its seat 54 to form the compartment 44. Thereafter steam flowing through the port 118 in the valve base 122 into the compartment 44 builds up pressure therein, so that spring 34 moves the plunger 120 to open passage 46. The pressure across the emergency valve 24 then becomes substantially balanced and the spring 34 will move the valve 24 off its seat 56.

The valve 22 then must be manually moved off its seat 54 in order to allow steam to flow once again to the engine 14 to resume the operation thereof.

I claim:

1. A fluid control device for a fluid driven motor having an inlet and having a lubricating system developing pressure, comprising a valve seat in the inlet, a valve movable on and off said seat to control the flow of fluid through said inlet, means operatively connected to said valve to urge said valve in one direction, means including a member operatively connected to said valve and having pressure surfaces subject to the pressure of such fluid, and a mechanism including an exhaust conduit adapted to exhaust fluid from one of said surfaces of said member to cause the valve to be moved in the other direction, a valve in said exhaust conduit for controlling the flow of fluid therethrough, and means automatically responsive to the pressure of the lubricating system to actuate said last valve.

2. A control device for an engine driven by steam and having an inlet therefor and a lubricating system developing pressure, including a valve seat in said inlet, a valve movable on and off said seat to control the flow of such steam through said inlet, spring means operatively connected to said valve to urge it in one direction, pressure means including a member operatively connected to said valve having pressure surfaces thereon subject to the pressure of such steam, and a trip mechanism adapted to effect a pressure differential across the member to cause the valve to move in the other direction, said mechanism including an exhaust conduit adapted to exhaust steam from one of said pressure surfaces, a valve seat in said conduit, an exhaust valve movable on and off said seat to control the flow of steam therethrough, means operatively connected to said exhaust valve adapted to urge it in one direction, a member operatively connected to said exhaust valve adapted to move the exhaust valve in the other direction, a conduit connecting said exhaust conduit with one side of the member adapted to convey steam thereto to move the exhaust valve in said other direction and means operatively associated with the last said valve automatically responsive to the pressure of the lubricating system to control the flow of fluid through the last said conduit.

3. A fluid control device for controlling the flow of fluid through a conduit, including a valve adapted to control flow through said conduit, a second valve movable to control flow of fluid through said conduit, said second valve being positioned relative to the said first valve such that a compartment is defined therebetween whenever both valves are closed, a second conduit open to the first conduit and adapted to convey such fluid to said compartment to move said second valve to an open position, and means operatively connected with said second valve adapted to control the flow through said second conduit.

4. A valve assembly for controlling the flow of fluid through a conduit comprising a valve seat in said conduit, a valve in the fluid stream including a head movable on and off said seat and having a recess open toward the downstream side of said seat and a port leading from the recess to the conduit upstream of said seat, and a member movable in the head adapted to control the flow of fluid through said port.

5. The valve assembly claimed in claim 4 in which said assembly includes a second valve on the downstream side of the seat which in its closed position cooperates with the first valve when in its closed position to define a compartment therebetween.

6. A valve assembly for controlling the flow of pressure fluid through a conduit, including a downstream valve seat and an opposed upstream seat, a valve manually movable on and off the downstream seat, and an automatic valve mechanism for controlling flow through the upstream seat, including a second valve movable on and off said upstream seat, said valve seats being spaced apart such that a chamber is defined therebetween when both valves are closed, a passage in the second valve leading from the conduit upstream of the second valve to the chamber between the seats when both valves are closed, a member reciprocally mounted in said second valve and adapted to control flow of pressure fluid through said passage, automatic means acting in one control position to move said member in one direction to restrict flow through the passage and to move the second valve onto its seat, and in another control position to urge said member and valve in the opposite direction, said second valve being held in its closed position by fluid pressure in the conduit until the first valve is closed and fluid flows through the passage to raise the pressure in said space to a predetermined value.

7. The valve assembly of claim 6 in which the member is constructed to be moved when the pressure in said space is below said predetermined valve to open the passageway before the second said valve is moved off its seat.

References Cited in the file of this patent
UNITED STATES PATENTS

| | | |
|---|---|---|
| 1,321,935 | Metten | Nov. 18, 1919 |
| 1,369,692 | Metzger | Feb. 22, 1921 |
| 1,574,260 | Schaeffer | Feb. 23, 1926 |
| 1,587,969 | Ludeman | June 8, 1926 |
| 2,717,004 | Page | Sept. 6, 1955 |